United States Patent
Uchino et al.

(10) Patent No.: US 12,490,290 B2
(45) Date of Patent: Dec. 2, 2025

(54) RADIO ACCESS NETWORK (RAN) ENHANCEMENT FOR UNEQUAL ERROR PROTECTION (UEP)

(71) Applicant: QUALCOMM Incorporated, San Diego, CA (US)

(72) Inventors: Toru Uchino, Zushi (JP); Umesh Phuyal, San Diego, CA (US); Alberto Rico Alvarino, San Diego, CA (US); Vivek Rajendran, San Diego, CA (US); Reza Barazideh, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 17/974,390

(22) Filed: Oct. 26, 2022

(65) Prior Publication Data
US 2024/0147515 A1    May 2, 2024

(51) Int. Cl.
*H04W 72/542*    (2023.01)

(52) U.S. Cl.
CPC ................ *H04W 72/542* (2023.01)

(58) Field of Classification Search
CPC ..... H04L 1/0061; H04L 1/007; H04L 1/1825; H04L 5/0055; H04L 47/36; H04L 69/22; H04W 56/00; H04W 72/23; H04W 72/542; H04W 74/0875
See application file for complete search history.

(56) References Cited

U.S. PATENT DOCUMENTS

| 9,762,358 B2* | 9/2017 | Gunnarsson | H04L 1/1825 |
| 2006/0245417 A1* | 11/2006 | Conner | H04L 1/007 370/352 |
| 2007/0258419 A1* | 11/2007 | Zhao | H04W 74/0875 370/338 |
| 2009/0177941 A1* | 7/2009 | Wager | H04L 1/0061 714/752 |
| 2012/0201184 A1* | 8/2012 | Ai | H04W 56/00 370/312 |

(Continued)

FOREIGN PATENT DOCUMENTS

WO    2022082763 A1    4/2022

OTHER PUBLICATIONS

International Search Report and Written Opinion—PCT/US2023/074801—ISA/EPO—Jan. 19, 2024.

(Continued)

*Primary Examiner* — Michael Thier
*Assistant Examiner* — Prince A Mensah
(74) *Attorney, Agent, or Firm* — Seyfarth Shaw LLP

(57) ABSTRACT

A method for wireless communication by a wireless device includes receiving a first bit sequence and a second bit sequence from an upper layer of a wireless communication protocol stack. The first bit sequence is assigned a first class and the second bit sequence is assigned a second class. The second bit sequence is included in a same medium access control (MAC) packet data unit (PDU) as the first bit sequence. The method also includes processing, at a physical layer, the first bit sequence with a first quality of service (QoS) level, and the second bit sequence with a second QoS level that is different from the first QoS level.

27 Claims, 16 Drawing Sheets

(56) References Cited

U.S. PATENT DOCUMENTS

2013/0039273 A1* 2/2013 Lee .................. H04L 47/36
                                                 370/328
2017/0214489 A1* 7/2017 Jiang ................ H04W 72/23
2018/0206213 A1* 7/2018 Kim .................. H04L 69/22
2019/0229843 A1* 7/2019 Yoshimoto .......... H04L 5/0055
2021/0320956 A1 10/2021 Berliner et al.

OTHER PUBLICATIONS

Shan Y., et al., "Cross Layer Techniques for Adaptive Video Streaming over Wireless Networks", 2002 IEEE International Conference on Multimedia and Expo, Swiss Federal Institute of Technology, Lausanne, Switzerland, IEEE Operations Center, Piscataway, NJ, vol. 1, Aug. 26-29, 2002, pp. 277-280.

* cited by examiner

RADIO ACCESS NETWORK (RAN) ENHANCEMENT FOR UNEQUAL ERROR PROTECTION (UEP)

FIELD OF THE DISCLOSURE

The present disclosure relates generally to wireless communications, and more specifically to radio access network (RAN) enhancement for unequal error protection (UEP).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communication by a wireless device includes receiving a first bit sequence and a second bit sequence from an upper layer of a wireless communication protocol stack. The first bit sequence is assigned a first class and the second bit sequence is assigned a second class. The second bit sequence is included in a same medium access control (MAC) packet data unit (PDU) as the first bit sequence. The method also includes processing, at a physical layer, the first bit sequence with a first quality of service (QoS) level, and the second bit sequence with a second QoS level that is different from the first QoS level.

Other aspects of the present disclosure are directed to an apparatus. The apparatus has a memory and one or more processors coupled to the memory. The processor(s) is configured to receive a first bit sequence and a second bit sequence from an upper layer of a wireless communication protocol stack. The first bit sequence is assigned a first class and the second bit sequence is assigned a second class. The second bit sequence is included in a same medium access control (MAC) packet data unit (PDU) as the first bit sequence. The processor(s) is also configured to process, at a physical layer, the first bit sequence with a first quality of service (QoS) level, and the second bit sequence with a second QoS level that is different from the first QoS level.

Other aspects of the present disclosure are directed to an apparatus. The apparatus includes means for receiving a first bit sequence and a second bit sequence from an upper layer of a wireless communication protocol stack. The first bit sequence is assigned a first class and the second bit sequence is assigned a second class. The second bit sequence is included in a same medium access control (MAC) packet data unit (PDU) as the first bit sequence. The apparatus also includes means for processing, at a physical layer, the first bit sequence with a first quality of service (QoS) level, and the second bit sequence with a second QoS level that is different from the first QoS level.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
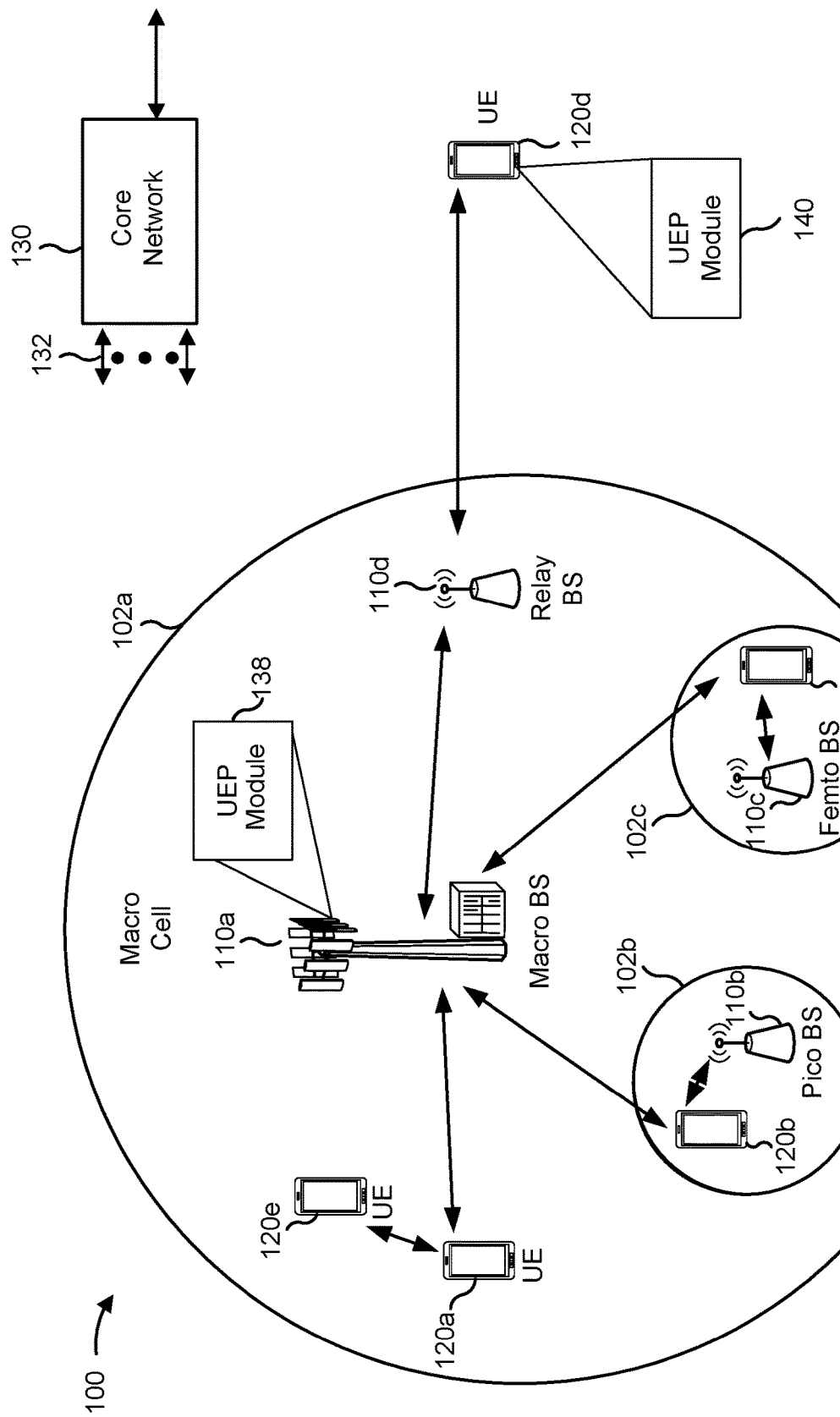
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A coder/decoder (codec) encodes and decodes data streams. Improving codec performance for wireless communications is desirable to increase signal quality. Unequal error protection (UEP) is one solution for improving codec performance. With unequal error protection, different bits may be treated differently, such that a small percentage of the bits will be more protected in the physical layer (PHY) and most of the bits will be less protected, thereby increasing errors associated with the less protected bits. Given that only some bits in a transport block (e.g., medium access control (MAC) packet data unit (PDU)) will switch from 0 to 1 or vice versa due to poor signal quality or some other issue, a decoder in a receiver may still utilize the other bits. Thus, multiple streams of bits may be created, with each stream receiving a different level of error protection. Additionally, an indication may be passed to the decoder for whether a packet has been correctly received. In an example, Header+ Class A bits are specified to be one hundred percent accurate end-to-end. Class B and Class C bits do not need one hundred percent accuracy.

According to aspects of the present disclosure, information is passed from the encoder to a 3GPP stack containing the limits of the Class A packets, Class B packets, and Class C packets. In some aspects, an entity in a protocol layer adds metadata for each packet class. A physical layer (PHY) (e.g., L1) may apply different treatment for bit sequences with different classes. More specifically, different L1 quality of service (QoS) treatment may be applied to different parts of a MAC subPDU. The physical layer (L1) treatment for the different classes can be implemented with different cyclic redundancy check (CRC) attachments, different modulation and coding schemes (MCSs), a different number of repetitions, or other techniques.

Aspects of the present disclosure address how the physical layer can be aware of the information of the classified data. In existing technologies, generally, the lower layer is not aware of the structure and contents of the service data unit (SDU) submitted by upper layers. To inform the physical layer of the classification of data received from upper layers, length information and class information may be conveyed. In a first option, the physical layer receives explicit information from the upper layer when an SDU is received from the upper layer. The explicit information may be the length information, e.g., the ending and starting bit positions of Class A data or Class B data in a subMAC PDU or MAC PDU. In a second option, the physical layer inspects the contents of each SDU from the upper layer.

The length of Class A data and Class B data can be variable. Aspects of the present disclosure introduce techniques for synchronizing the code block sizes for Class A and Class B data between the transmitter and receiver. In some aspects of the present disclosure, the transmitter indicates the code block sizes for the Class A and/or Class B packets. In other aspects, the content of the MAC PDU is deterministic.

Hybrid automatic repeat request (HARQ) is a technique where a receiver requests retransmission of a transport block that was not correctly decoded. Because downlink HARQ is asynchronous in new radio (NR), the user equipment (UE) should understand when to deliver a received bit sequence to upper layers if CRC does not pass. According to some aspects of the present disclosure, the UE stops waiting for a HARQ retransmission based on an explicit indication. If a MAC entity receives an indication for the HARQ process and the transport block was not successfully decoded, the MAC entity delivers the bit sequence (and/or soft bit information) to upper layers. In other aspects, implicit detection is used. If a MAC entity receives a transport block and this transport block was not successfully decoded, the MAC entity delivers the bit sequence (and/or soft bit information) to upper layers after a certain time period. This certain time period may be counted by a timer.

Particular aspects of the subject matter described in this disclosure can be implemented to realize one or more of the following potential advantages. In some examples, the described techniques, such as receiving bit sequences and processing the bit sequences with different levels of quality of service (QoS) may increase spectrum utilization. Spectrum utilization may be improved by using received bit sequences as much as possible, rather than discarding the bit sequences, while protecting the data from errors with different levels of treatment.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an unequal error protection (UEP) module 138, 140. For brevity, only one UE 120d and one base station 110 are shown as including the UEP module 138, 140. The UEP module 138, 140 may receive a first bit sequence and a second bit sequence from an upper layer of a wireless communication protocol stack. The first bit sequence is assigned a first class and the second bit sequence is assigned a second class. The second bit sequence is included in a same medium access control (MAC) packet data unit (PDU) as the first bit sequence. The UEP module 138, 140 may also process at a physical layer, the first bit sequence with a first quality of service (QoS) level, and the second bit sequence with a second QoS level that is different from the first QoS level.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a medium access control-control element (MAC-CE) or via system information (e.g., a system information block (SIB).

As indicated above, FIG. 1 is provided merely as an example. Other examples may differ from what is described with regard to FIG. 1.

Figure 2:
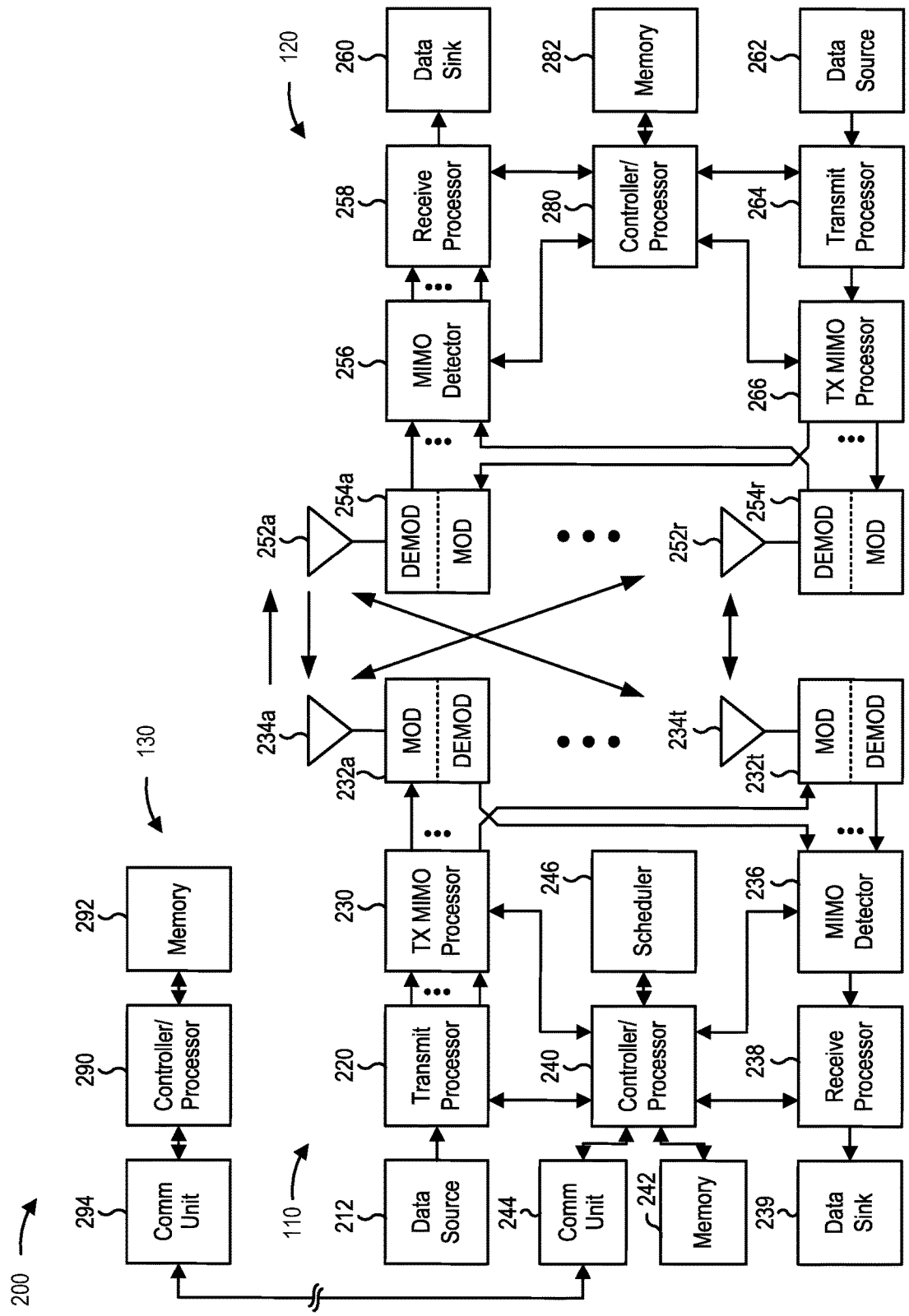
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with unequal error protection as described in more detail elsewhere. For example, the controller/processor 240 of the base station 110, the controller/processor 280 of the UE 120, and/or any other component(s) of FIG. 2 may perform or direct operations of, for example, the process of FIG. 18 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for processing, means for transmitting, means for detecting, and means for determining. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
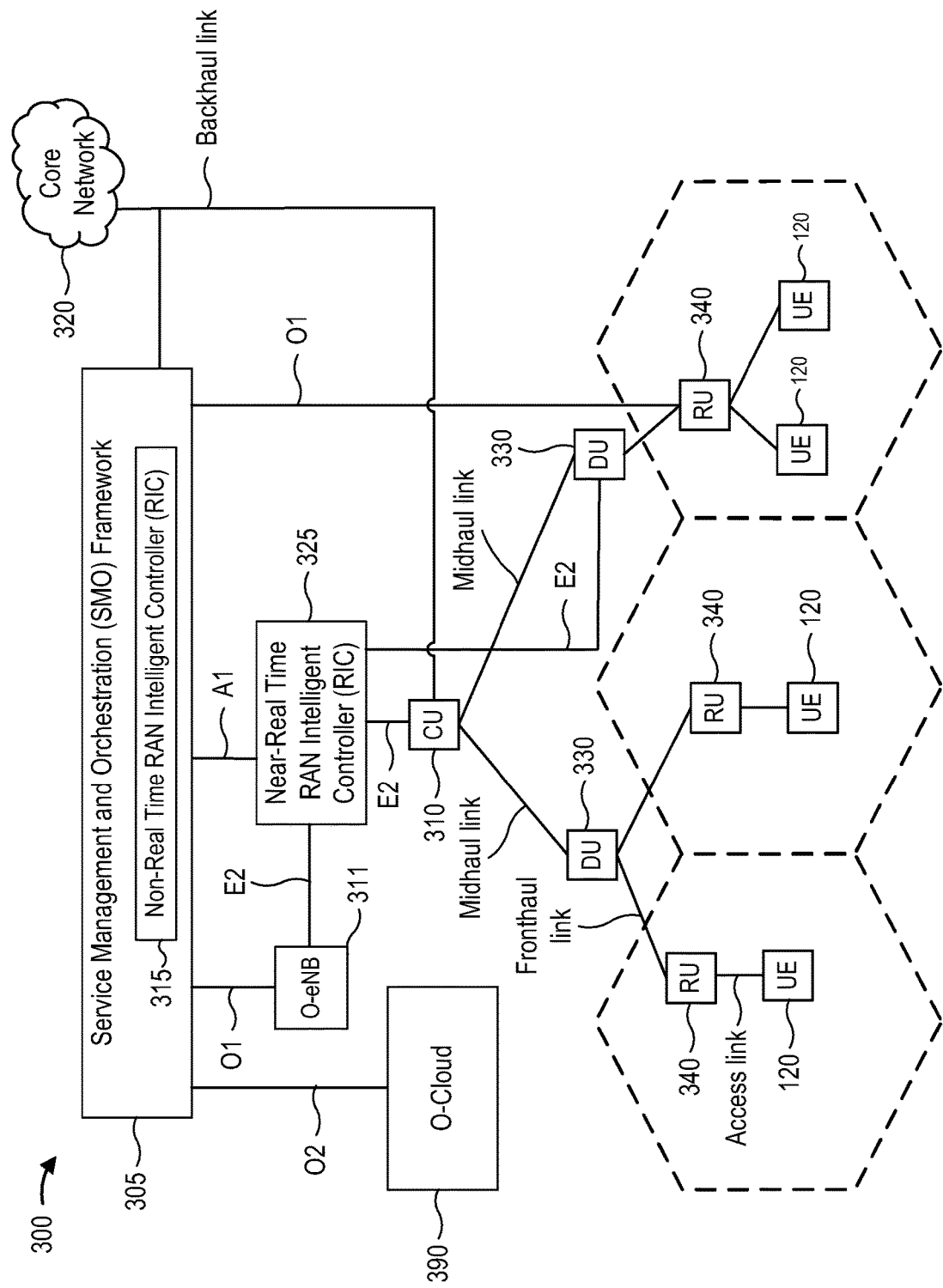
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

A coder/decoder (codec) encodes and decodes data streams. Improving codec performance for wireless communications is desirable to increase signal quality. Unequal error protection (UEP) is one solution for improving codec performance. With unequal error protection, different bits may be treated differently, such that a small percentage of the bits will be more protected in the physical layer (PHY) and most of the bits will be less protected. The less protected bits may be more erroneous than the protected bits. Given that only some bits in a transport block (e.g., medium access control (MAC) packet data unit (PDU)) will flip from 0 to 1 or vice versa due to poor signal quality or some other issue, a decoder in the receiver side may still utilize the other bits. Thus, multiple streams of bits may be created, with each stream receiving a different level of error protection. Additionally, an indication may be passed to the decoder for whether the packet has been correctly received.

Figure 4:
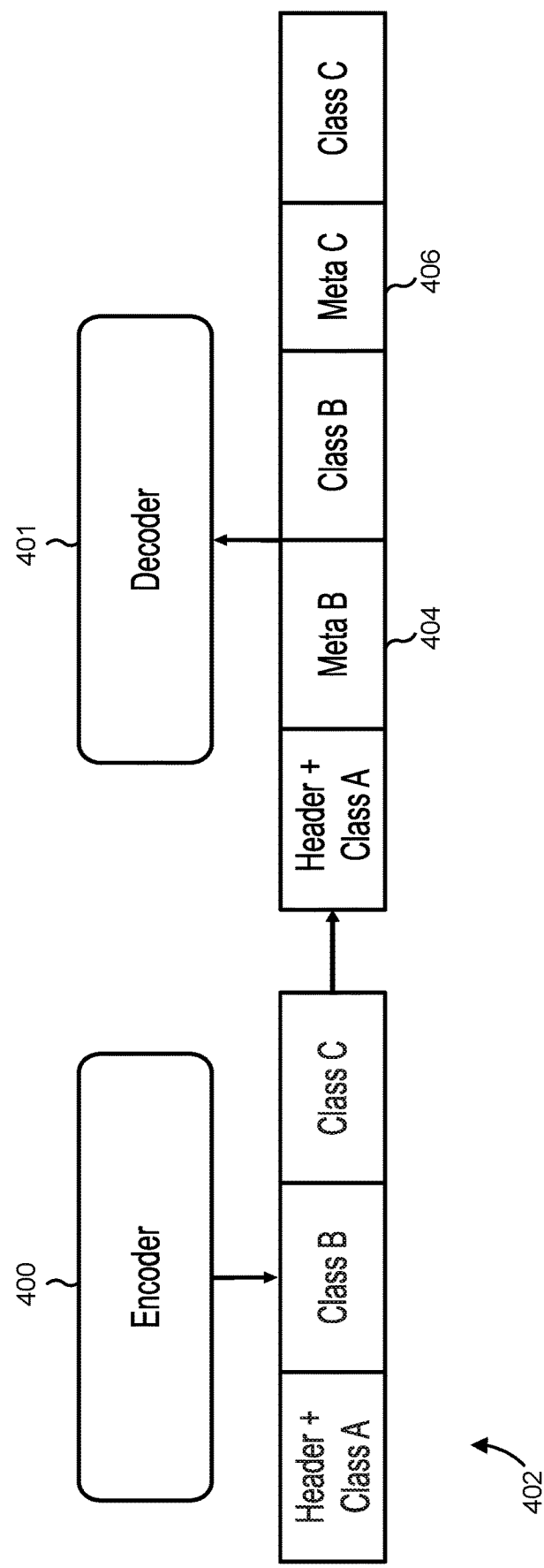
FIG. 4 is a block diagram illustrating an end-to-end desirable channel model, according to aspects of the present disclosure.

FIG. 4 is a block diagram illustrating an end-to-end desirable channel model, according to aspects of the present disclosure. In the example of FIG. 4, an encoder 400 processes bits 402 for transmission to a decoder 401. In this example, the Header+Class A bits are specified to be one hundred percent accurate end-to-end. The Class B and Class C bits do not need one hundred percent accuracy. Thus, the decoder may receive metadata 404, 406 for these Class B and Class C bits. The metadata 404, 406 may include an expected bit error rate (BER) of the bits, or if error detection is available, whether the bits are correct. The metadata 404, 406 may also include a mean, variance, and/or log-likelihood ratios (LLRs) for each of the bits. It is noted that although three classes of packets are discussed, the present disclosure is not so limited. Any number of two or more classes are contemplated.

With a current 3GPP protocol stack, all bits are mapped to a single packet data convergence protocol (PDCP) service data unit (SDU). The single PDCP SDU provides insufficient granularity, thereby preventing differentiating quality of service (QoS) for encoder output. In other words, either the whole packet is lost or nothing is lost. With this protocol stack, Class B and Class C bits may be moot.

An alternative approach specifies the encoder to generate three packets: one packet for the Header+Class data, one packet for the Class B data, and one packet for the Class C data. This approach, however, creates additional headers in all the protocol stack layers. In other words, the Header+Class A packet includes a real time transport protocol/user datagram protocol/Internet protocol (RTP/UDP/IP) header, the Class B packet includes its own RTP/UDP/IP header, and the Class C packet also includes its own RTP/UDP/IP header. Such an approach is not feasible for low-rate codecs. Moreover, this approach has the issue of not allowing erroneous bits to pass through According to aspects of the present disclosure, information is passed from the encoder to the 3GPP stack containing the limits of the Class A packets, Class B packets, and Class C packets. The information may be passed with signaling (e.g., the parameters of the encoder may be configured by radio resource control (RRC) signaling. Alternatively, an RTP/UDP/IP header may be used. According to aspects of the present disclosure, an entity in the protocol layer adds metadata for each packet class. The metadata may indicate whether a packet is missed, a percentage of errors, quality, etc. An example of quality is described with respect to a modulation and coding scheme (MCS) used to transmit bit sequences. If the MCS is conservative, higher quality may be achieved.

Aspects of the present disclosure are directed to protocol stack architectures to implement unequal error protection. The protocol stacks of the present disclosure enable interaction between the current 3GPP protocol stack and the upper layer of the protocol stack, and also provide access to the layer one/layer two (L1/L2) protocol in the 3GPP protocol stack.

Figure 5:
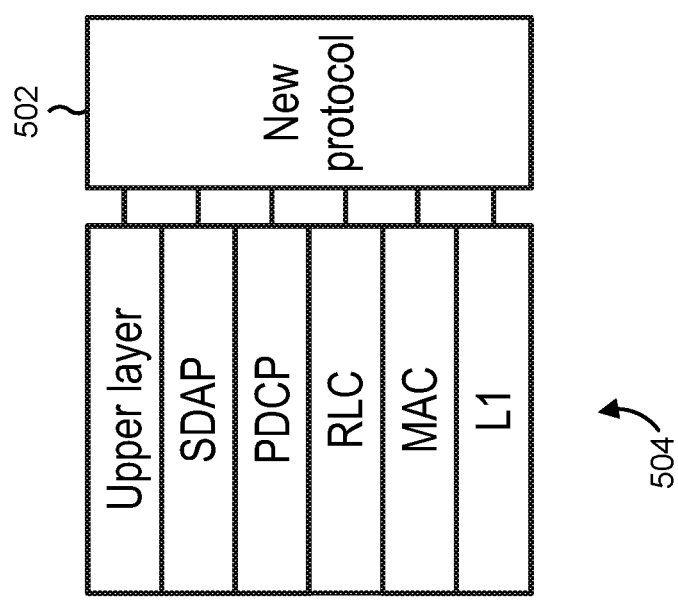
FIG. 5 is a block diagram illustrating a protocol stack for a user equipment (UE) and an integrated base station, according to aspects of the present disclosure.

FIG. 5 is a block diagram illustrating a protocol stack for a user equipment (UE) and an integrated base station, according to aspects of the present disclosure. As seen in the example of FIG. 5, a new protocol 502 communicates with the layers of the current 3GPP protocol stack 504. For example, the new protocol 502 communicates with the L1, MAC layer, RLC layer, PDCP layer, SDAP layer, and upper layer of the 3GPP protocol stack 504.

Figure 6:
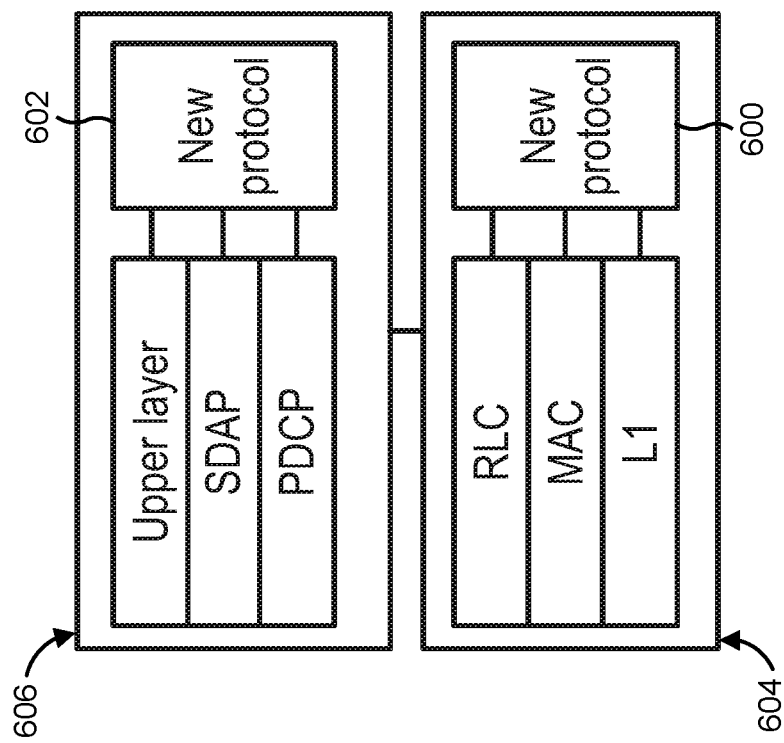
FIG. 6 is a block diagram illustrating a protocol stack for a disaggregated base station, according to aspects of the present disclosure.

FIG. 6 is a block diagram illustrating a protocol stack for a disaggregated base station, according to aspects of the present disclosure. As seen in the example of FIG. 6, two components of a new protocol 600, 602 communicate with the layers of the 3GPP protocol stack 604, 606 split between a distributed unit (DU) and a central unit (CU). For example, a first component of the new protocol 600 communicates with the L1, MAC layer, and RLC layers of a first portion of the 3GPP protocol stack 604, and a second component of the new protocol 602 communicates with the PDCP layer, SDAP layer, and upper layer of a second portion of the 3GPP protocol stack 606.

Figure 7:
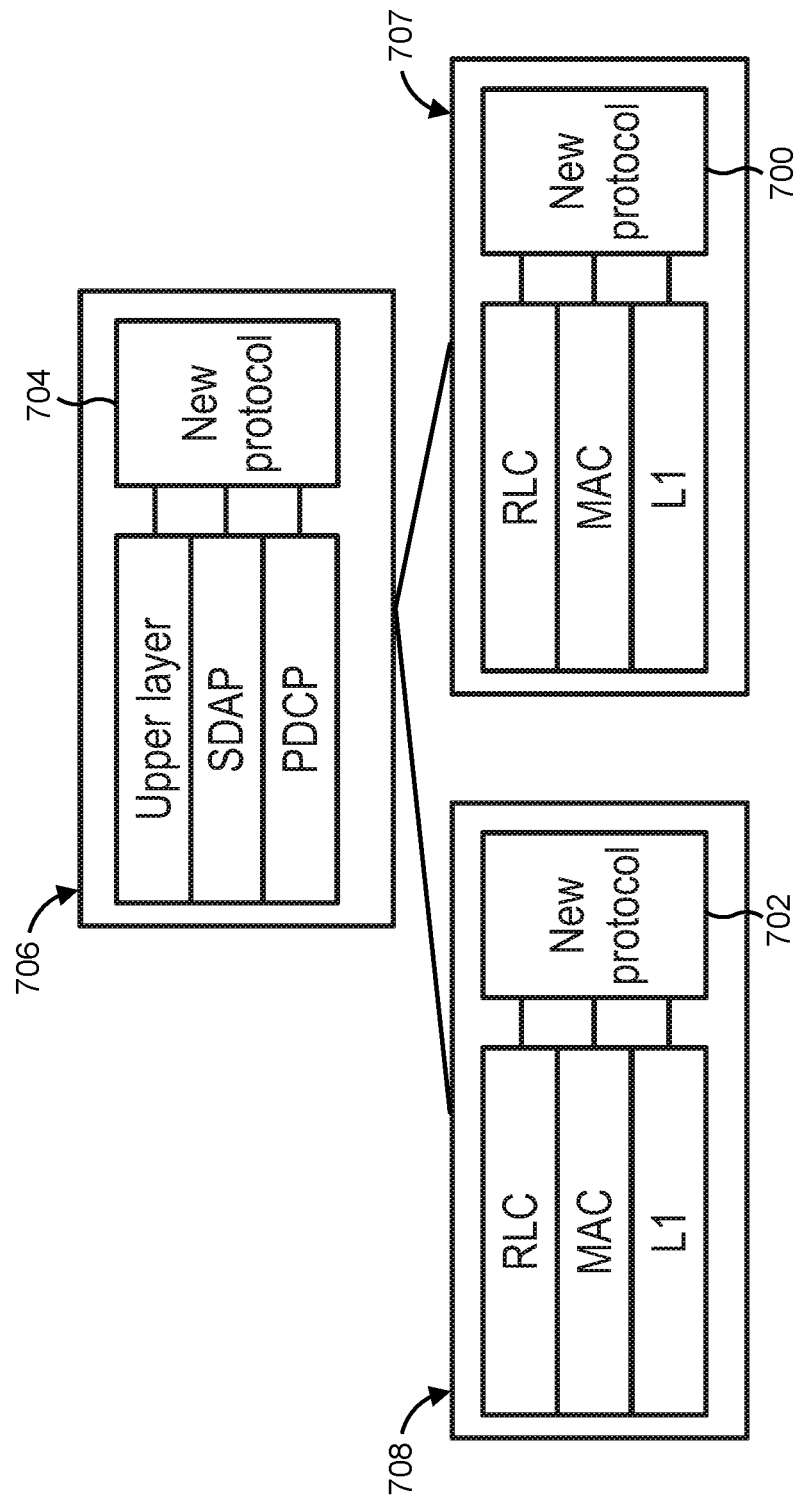
FIG. 7 is a block diagram illustrating a protocol stack for a dual connectivity deployment, according to aspects of the present disclosure.

FIG. 7 is a block diagram illustrating a protocol stack for a dual connectivity deployment, according to aspects of the present disclosure. As seen in the example of FIG. 7, three components of a new protocol 700, 702, 704 communicate with the layers of the 3GPP protocol stack, split in accordance with a dual connectivity deployment. For example, a first component of the new protocol 700 communicates with the L1, MAC layer, and RLC layer of a first connectivity element 707, and a second component of the new protocol 702 communicates with the L1, MAC layer, and RLC layer of a second connectivity element 708. A third component of the new protocol 704 communicates with the PDCP layer, SDAP layer, and upper layer of a central component 706 in the dual connectivity deployment.

According to aspects of the present disclosure, the physical layer PHY (e.g., L1) applies different treatment for bit sequences with different classes. More specifically, aspects of the present disclosure apply different L1 QoS treatment for different parts of a MAC subPDU. Classes A and B are used for simplicity in the following description, but more than two classes are contemplated.

A MAC PDU of a voice packet consists of multiple parts. The voice packet may be processed incorrectly at the receiver if elements associated with the voice packet are corrupted. These elements may be designated as Class A elements. Examples of Class A elements of a voice packet include the L2 header (e.g., the MAC, RLC, PDCP and SDAP headers), control information of each sublayer in L2 (e.g., the medium access control-control elements (MAC CEs) and control PDUs), the IP/UDP/RTP header (or robust header compression (ROHC) header) and the RTP payload header. Less critical data carried in Class B elements includes the RTP payload, other than RTP payload header.

Figure 8:
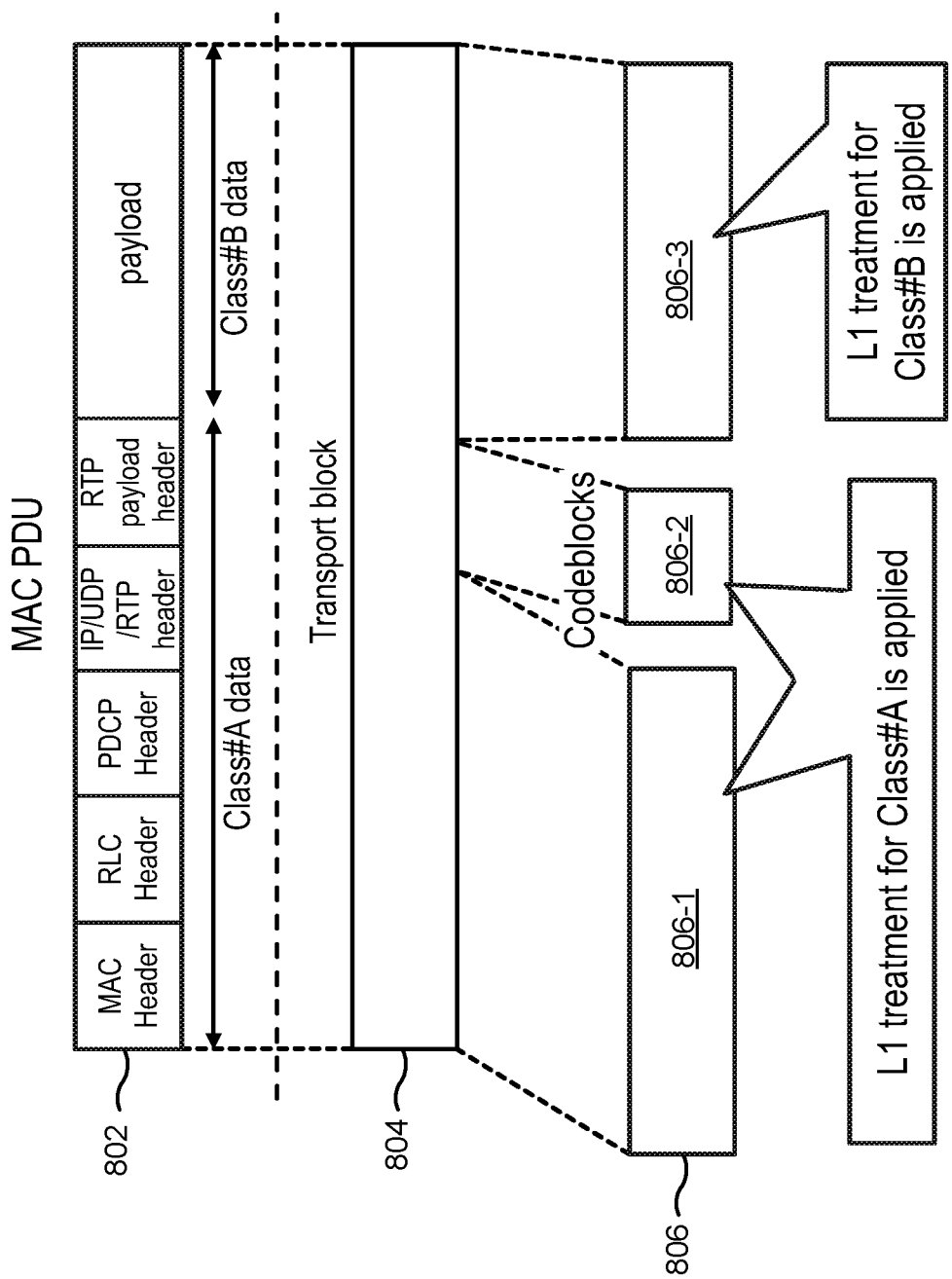
FIG. 8 is a block diagram illustrating different treatment for different packet classes, according to aspects of the present disclosure.

FIG. 8 is a block diagram illustrating different treatment for different packet classes, according to aspects of the present disclosure. In the example of FIG. 8, the Class A data of a MAC PDU 802 includes the MAC header, the RLC header, the PDCP header, the IP/UDP/RTP header, and the RTP payload header. The Class B data in the MAC PDU 802 includes the payload. The physical layer (L1) treatment for the different classes can be implemented with different cyclic redundancy check (CRC) attachments, different modulation and coding schemes (MCSs), a different number of repetitions, or other techniques. The data classification may occur at the code block level or transport block (TB) level. For headers, the code block level is the more desirable option. For control information, different MAC PDUs are possible. thus. both the code block level and transport level can apply. In the example of FIG. 8, the data classification occurs at the level of a code block 806. That is, the Class A data and Class B data may be passed from the transport block 804 to the code blocks 806, where the data is divided such that different L1 treatment is applied for the Class A data and the Class B data. Because the data is too long for a single Class A code block in the example of FIG. 8, the Class A data is divided into two code blocks 806-1, 806-2. The Class B data is included in a third code block (806-3)

Aspects of the present disclosure address how the physical layer can be aware of the information of the classified data. In existing technologies, generally, the lower layer is not aware of the structure and contents of the SDU submitted by upper layers. To inform the physical layer of the classification of data received from upper layers, length information and class information may be conveyed.

In a first option, the physical layer receives explicit information from the upper layer when an SDU is received from the upper layer. The explicit information may be the length information, e.g., the ending and starting bit positions of Class A data or Class B data in a subMAC PDU or MAC PDU. The length information may be provided for each MAC subPDU or can be provided for the resulting MAC PDU when multiple MAC subPDUs are concatenated. Additional information may also be received, such as a logical channel (LCH) identity of the bits, whether the bits are control bits or data bits, and what the transport channel is for the bits. For control information (e.g., MAC CE, control PDU), because all the bits are classified as Class A, the explicit information may be an example of control information or a fixed value (e.g., 00000000 or 11111111 in cases when the length of the information is eight bits).

In a second option, the physical layer inspects the contents of each SDU from the upper layer. With this option, it is assumed that the physical layer knows the structure of the upper layer protocol in advance.

Figure 9:
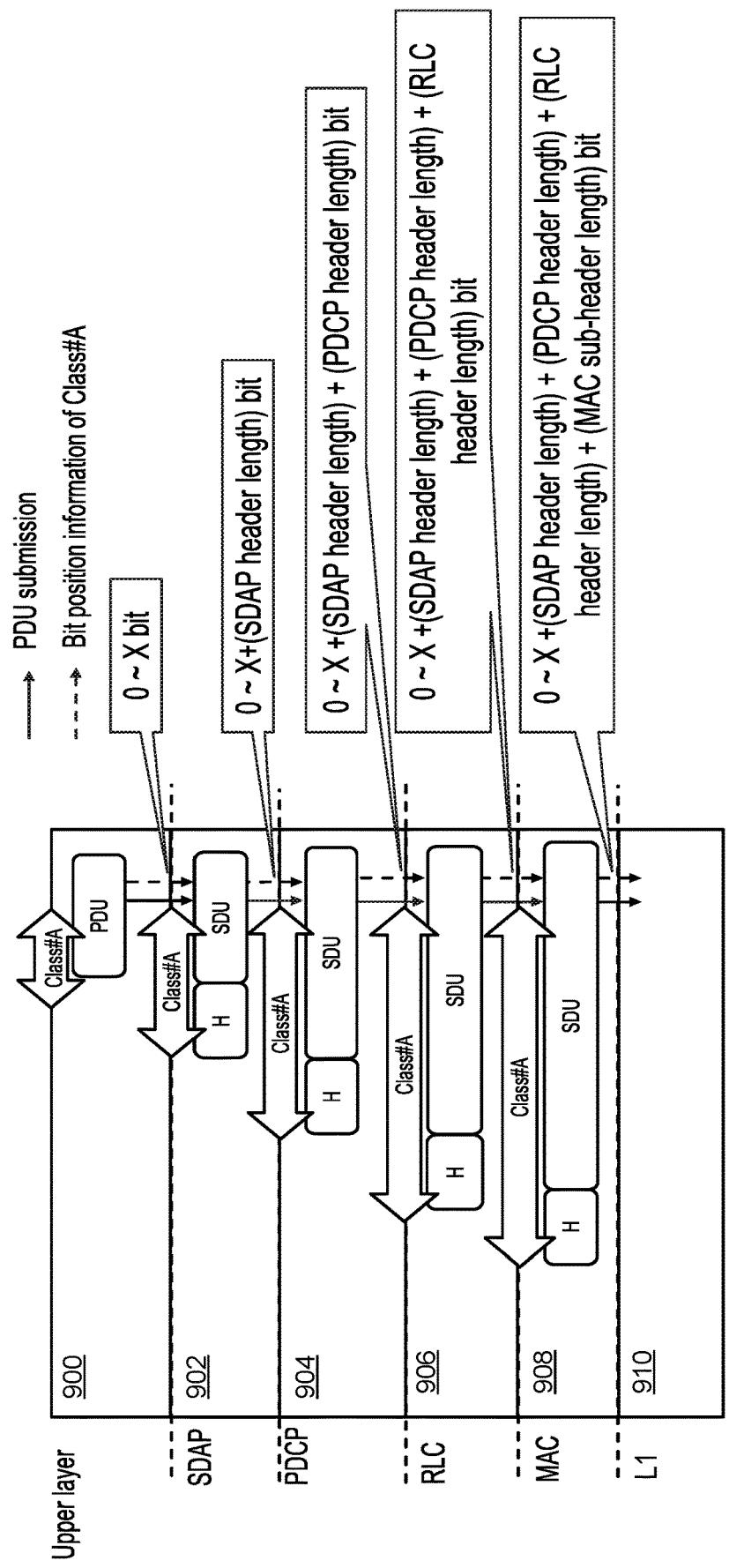
FIGS. 9 and 10 are block diagrams illustrating interactions between protocol layers for data classification, according to aspects of the present disclosure.

FIG. 9 is a block diagram illustrating interactions between protocol layers for data classification, according to aspects of the present disclosure. In the example of FIG. 9, a single MAC SDU is present without a MAC CE. Class B data is not shown in FIG. 9 for ease of explanation. According to aspects of the present disclosure, each layer indicates to its lower layer(s) the bit position information when the PDU is submitted. On the network side with a CU-DU split (as seen in FIG. 3), the information may be carried with the PDU over an F1 interface.

In the example of FIG. 9, an upper layer 900 transmits a PDU with Class A data to an SDAP layer 902. The upper layer 900 also transmits bit position information for the Class A data. For example, bit 0 to bit X may be indicated as Class A data. The SDAP layer 902 then generates and submits an SDAP SDU to a PDCP layer 904, along with an SDAP header (H). The SDAP header is Class A data, in addition to the Class A data from the upper layer PDU. The bit position information indicates Class A data as bit 0 to bit X as well as the bits corresponding to the SDAP header length.

The PDCP layer 904 then generates and submits a PDCP SDU to an RLC layer 906, along with a PDCP header. The PDCP header is Class A data, in addition to the Class A data received from the SDAP layer 902. The bit position information indicates Class A data as bit 0 to bit X plus the bits corresponding to the SDAP and PDCP header lengths. The RLC layer 906 generates and submits an RLC SDU to a MAC layer 908, along with an RLC header. The RLC header is Class A data, in addition to the Class A data received from the PDCP layer 904. The bit position information indicates Class A data bit 0 to bit X as well as the bits corresponding to the SDAP, PDCP and RLC header lengths. The MAC layer 908 generates and submits a MAC SDU to a physical layer (L1) 910, along with a MAC subheader. The MAC subheader is Class A data, in addition to the Class A data received from the RLC layer 906. The bit position information indicates Class A data as bit 0 to bit X as well as the bits corresponding to the SDAP, PDCP, RLC, and MAC sub/header lengths.

Figure 10:
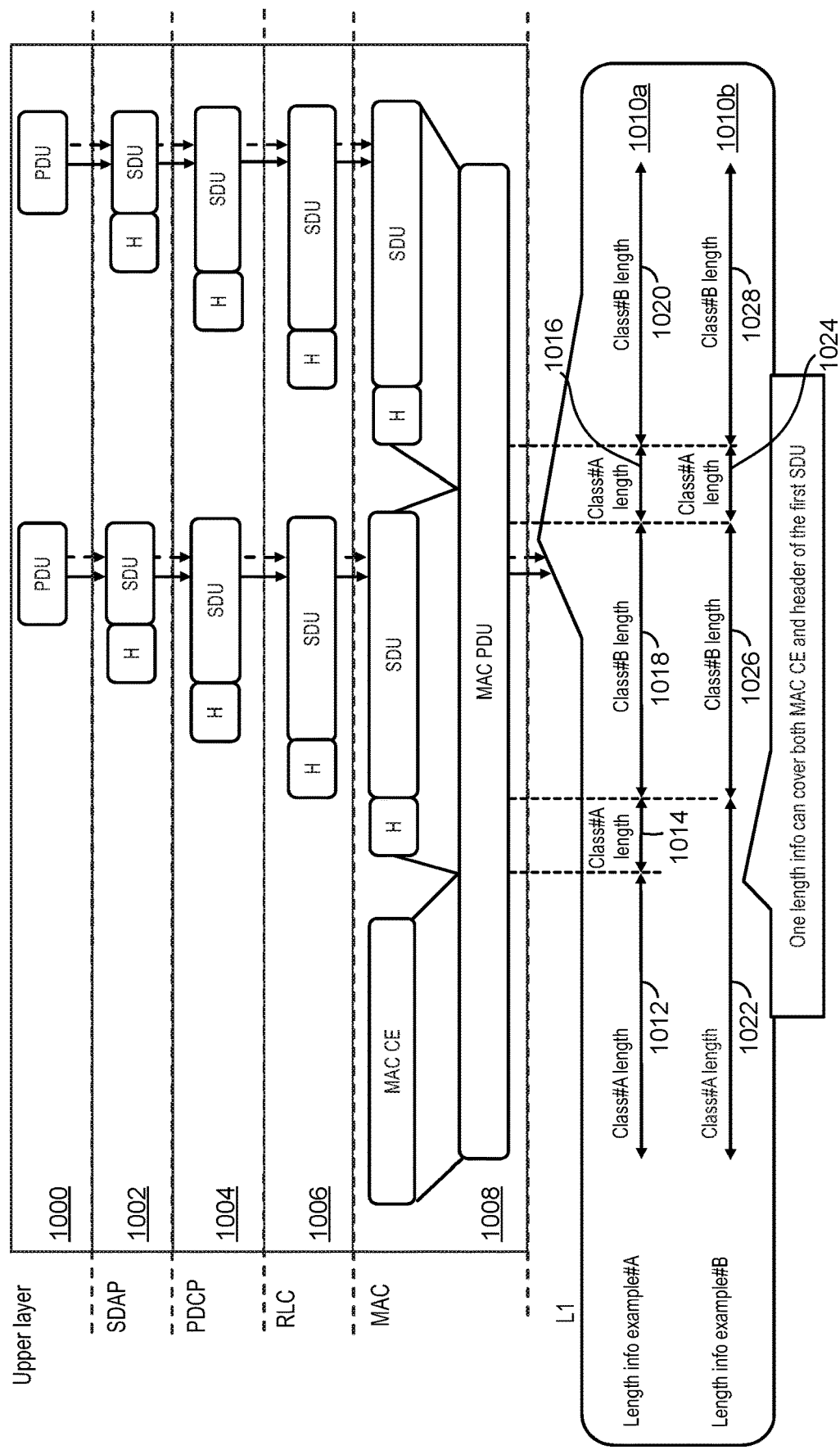

FIG. 10 is a block diagram illustrating interactions between protocol layers for data classification, according to aspects of the present disclosure. In the example of FIG. 10, a MAC CE is present along with two MAC SDUs.

As shown in the example of FIG. 10, an upper layer 1000 transmits two PDUs with Class A data and Class B to an SDAP layer 1002. The upper layer 1000 also transmits bit position information for the Class A data and the Class B data. The SDAP layer 1002 then generates and submits two SDAP SDUs to a PDCP layer 1004, along with an SDAP header (H) for each SDAP PDU. The SDAP headers are Class A data, in addition to the Class A data from the upper layer PDUs. The PDCP layer 1004 then generates and submits PDCP SDUs to an RLC layer 1006, along with PDCP headers. The PDCP headers are Class A data, in addition to the Class A data received from the SDAP layer 1002. The RLC layer 1006 generates and submits RLC SDUs to a MAC layer 1008, along with RLC headers. The RLC headers are Class A data, in addition to the Class A data received from the PDCP layer 1004.

In the example of FIG. 10, the MAC layer 1008 generates MAC SDUs and MAC headers based on the data received from the RLC layer 1006. The MAC layer 1008 multiplexes the MAC SDUs, a MAC CE, and the MAC headers in a MAC PDU. The MAC layer 1008 submits the MAC PDU to a physical layer (L1) (1010a, 1010b). The MAC headers and the MAC CE are Class A data, in addition to any Class A data received from the RLC layer 1006.

Two options for presenting the bit position information are shown in FIG. 10. In a first option, the bit position data received at the physical layer 1010a includes a length of the MAC CE 1012, a length of the header for the first SDU 1014, and a length of the header for the second SDU 1016 for the Class A data. A length of the Class B data from the first SDU 1014 and a length of the Class B data from the second SDU 1020 are also provided. In a second option, the bit position data received at the physical layer 1010b includes a length of the MAC CE, plus a length of the first header for the first SDU 1022 for the Class A data. That is, the length information can cover the lengths of both the MAC CE and the header of the first MAC SDU. The bit position data also includes a length of the Class A data second header for the second SDU 1024. A length of the Class B data from the first SDU 1026 and a length of the Class B data from the second SDU 1028 are also provided.

Figure 11A:
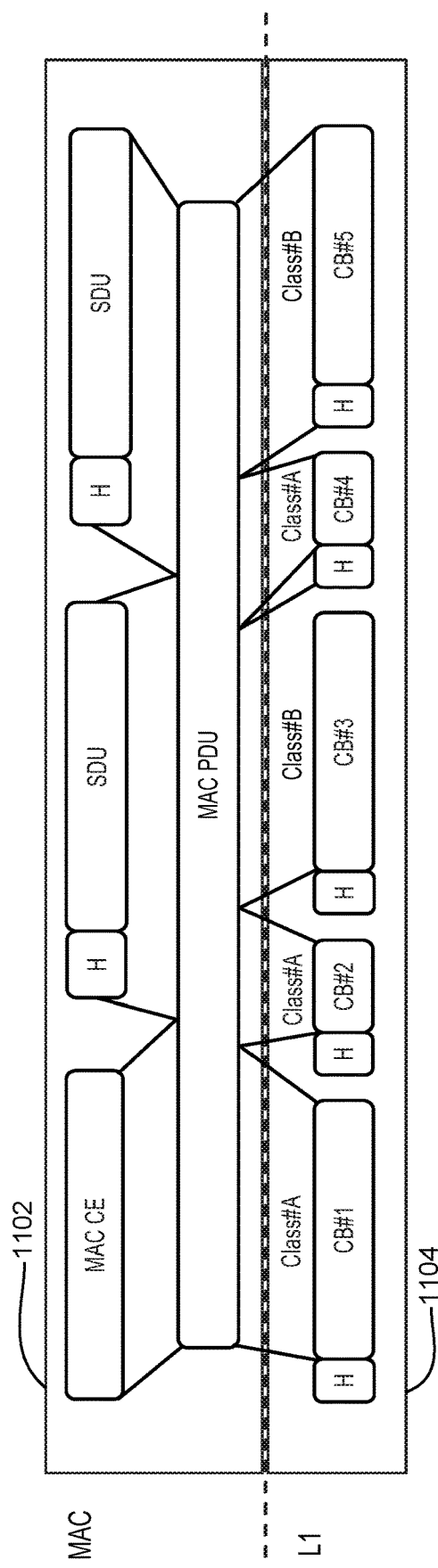
FIGS. 11A and 11B are block diagrams illustrating dividing of a medium access control (MAC) protocol data unit (PDU) into code blocks, in accordance with aspects of the present disclosure.
Figure 11B:
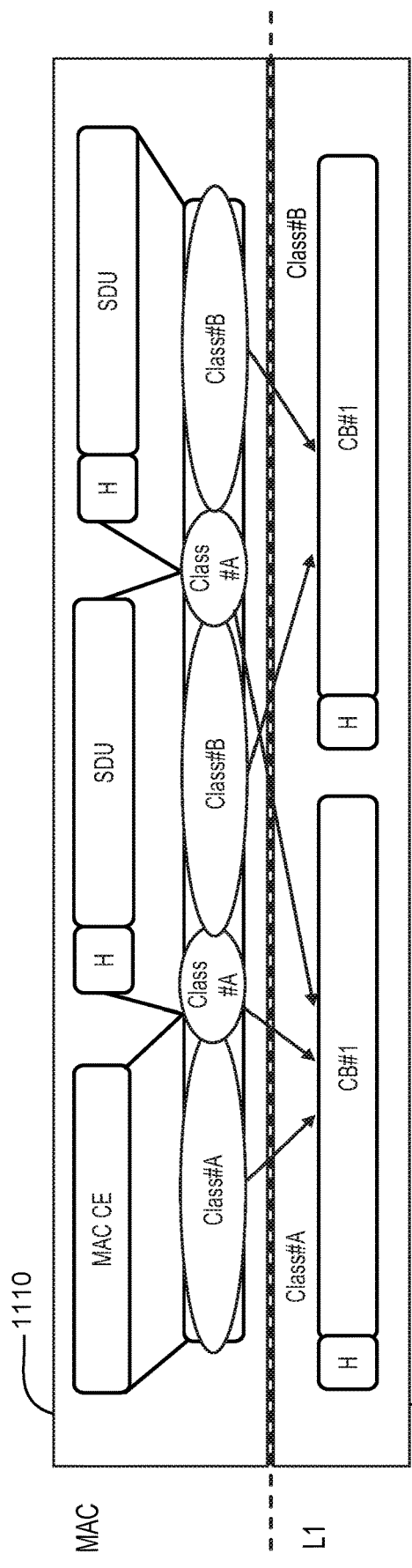

FIGS. 11A and 11B are block diagrams illustrating dividing of a medium access control (MAC) protocol data unit (PDU) into code blocks, in accordance with aspects of the present disclosure. In the example of FIGS. 11A and 11B, MAC layers 1102, 1110 multiplex MAC SDUs, a MAC CE, and MAC headers into a MAC PDU.

As shown in the example of FIG. 11A, the MAC layer 1102 submits the MAC PDU to a physical layer 1104, which divides the Class A data and Class B data into five code blocks (CB #1, CB #2, CB #3, CB #4, CB #5). Each code block is also associated with a header (H) to indicate the length of the corresponding code block. In the example of FIG. 11A, three code blocks (CB #1, CB #2, CB #4) are created for Class A data. Two code blocks (CB #3, CB #5) are created for Class B data.

In the example of FIG. 11B, the MAC layer 1110 submits the MAC PDU to a physical layer 1106, which divides the Class A data and Class B data into two code blocks (CB #1, CB #2). Each code block is also associated with a header (H) to indicate how the data is multiplexed within the code block. For example, the header indicates which bits correspond to the MAC CE, which bits correspond to the header of the first SDU, and which bits correspond to the header of the second SDU. In the example of FIG. 11B, one code block (CB #1) is created for all Class A data, and one code block (CB #2) is created for all Class B data.

The length of Class A data and Class B data can be variable. Aspects of the present disclosure introduce techniques for synchronizing the code block sizes for Class A and Class B data between the transmitter and receiver. The Class A data size is variable because some control information, such as MAC CEs and control PDUs, may or may not be present depending on the MAC layer and/or other layers status. Additionally, a robust header compression (ROHC) header size is variable depending on the ROHC state, e.g., whether a full header or compressed header is used. The number of MAC CEs and subPDUs multiplexed in a MAC PDU is variable. Variation may also occur because a length of the RTP payload header is selected by upper layers, and the packet size may be different, for example, voice packet or silence insertion descriptor (SID) packets may have different sizes.

In some aspects of the present disclosure, the transmitter indicates the code block sizes for the Class A and/or Class B packets. For example, the physical downlink control channel (PDCCH) may be used to indicate the size for downlink communications, and the physical uplink shared channel (PUSCH) or physical uplink control channel (PUCCH) may indicate the size for uplink communications.

In other aspects, the content of the MAC PDU is deterministic. If the content and MAC header length are deterministic, the code block sizes for the Class A and/or Class B data can be naturally deterministic. For uplink communications, the UE receives multiple grants. Each grant has a size corresponding to the assumed total size of the MAC PDU containing the ROHC header size, MAC header size, packet size, number of packets multiplexed, etc. The network may indicate whether control information can be multiplexed or not in the MAC PDU. Therefore, because the network indicates which headers are in the MAC PDU, the receiver knows in advance which code blocks contain Class A data and which code blocks contain Class B data. The information can also be preconfigured. When uplink data become available for transmission, the UE may construct the MAC PDU using the uplink grant that has a corresponding size. Otherwise, the UE skips the transmission and triggers a scheduling request if an uplink grant is not available.

Hybrid automatic repeat request (HARQ) is a technique where a receiver requests retransmission of a transport block that was not correctly decoded. Because downlink HARQ is asynchronous in new radio (NR), the UE should understand when to deliver a received bit sequence to upper layers if CRC does not pass (e.g., the bit sequence is not successfully decoded). According to some aspects of the present disclosure, the UE stops waiting for a HARQ retransmission based on an explicit indication. If a MAC entity receives an indication for the HARQ process and the transport block was not successfully decoded, the MAC entity delivers the bit sequence (and/or soft bit information) to upper layers.

The indication can be a newly defined indication or a toggled new data indicator (NDI) for the same HARQ process, etc. Radio resource control (RRC) signaling can configure the number of downlink HARQ retransmissions that the UE needs to assume.

Figure 12:
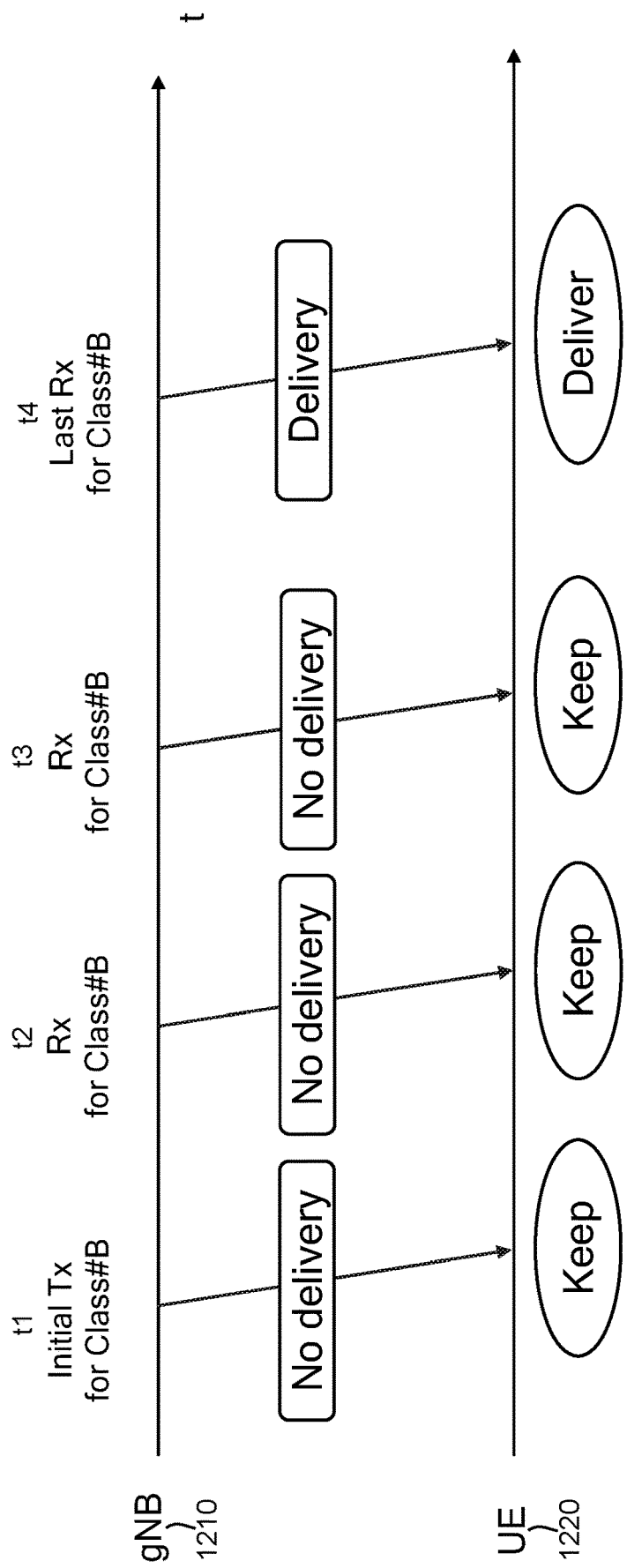
FIG. 12 is a timing diagram illustrating explicit indication for retransmission delivery, in accordance with aspects of the present disclosure.

FIG. 12 is a timing diagram illustrating explicit indication for retransmission delivery, in accordance with aspects of the present disclosure. In the example of FIG. 12, a base station (e.g., gNB) timeline 1210 and a UE timeline 1220 are shown. At time t1, the base station sends an initial transmission (Tx) for Class B data to the UE. Because the transmission is not successfully decoded, and no explicit delivery instruction is received, the UE keeps the information in its buffer at the physical layer or any equivalent. At time t2, the base station sends a first retransmission (Rx) for Class B data to the UE. Because the retransmission is not successfully decoded, and no explicit delivery instruction is received, the UE keeps the information in its buffer at the physical layer or any equivalent. At time t3, the base station sends a second retransmission for Class B data to the UE. Because the retransmission is still not successfully decoded, and no explicit delivery instruction is received, the UE retains the information in its buffer at the physical layer or any equivalent. At time t4, the base station sends a final retransmission of the Class B data to the UE. Regardless of whether the retransmission is successfully decoded, the UE delivers the information in its buffer at the physical layer (or any equivalent) to upper layers. The delivery occurs because, at time t4, the base station also instructs the UE to deliver the data to upper layers, regardless of whether errors occur while decoding the retransmission.

In other aspects, implicit detection is used. If a MAC entity receives a transport block and this transport block was not successfully decoded, the MAC entity delivers the bit sequence (and/or soft bit information) to upper layers after a certain time period. This certain time period may be counted by a timer. The timer may be started upon receiving the new transport block for the HARQ process, or the timer may be started (or restarted) upon each reception of the data for the HARQ process. This option may be realized by a timer such as a drx-RetransmissionTimer. In the implicit detection option, the timer may be applied only for unprotected data. Thus, the UE should be aware of which received transport block it should apply this implicit detection to, for example, based on an indication from the network, such as downlink control information (DCI) or the network may configure some HARQ process(es) semi-statically. It is noted that both the implicit and explicit options may be applied simultaneously. If a MAC PDU is mapped to multiple code blocks with different classes (e.g., Class A code block (MAC header) and Class B code block (leftovers)), if the Class A code block is not successfully decoded, the Class B code block(s) should not be delivered to upper layers because the MAC PDU cannot be reassembled without the Class A data. In some aspects, the lower layer may indicate to upper layers if the code block is successfully decoded or unsuccessfully decoded.

Figure 13:
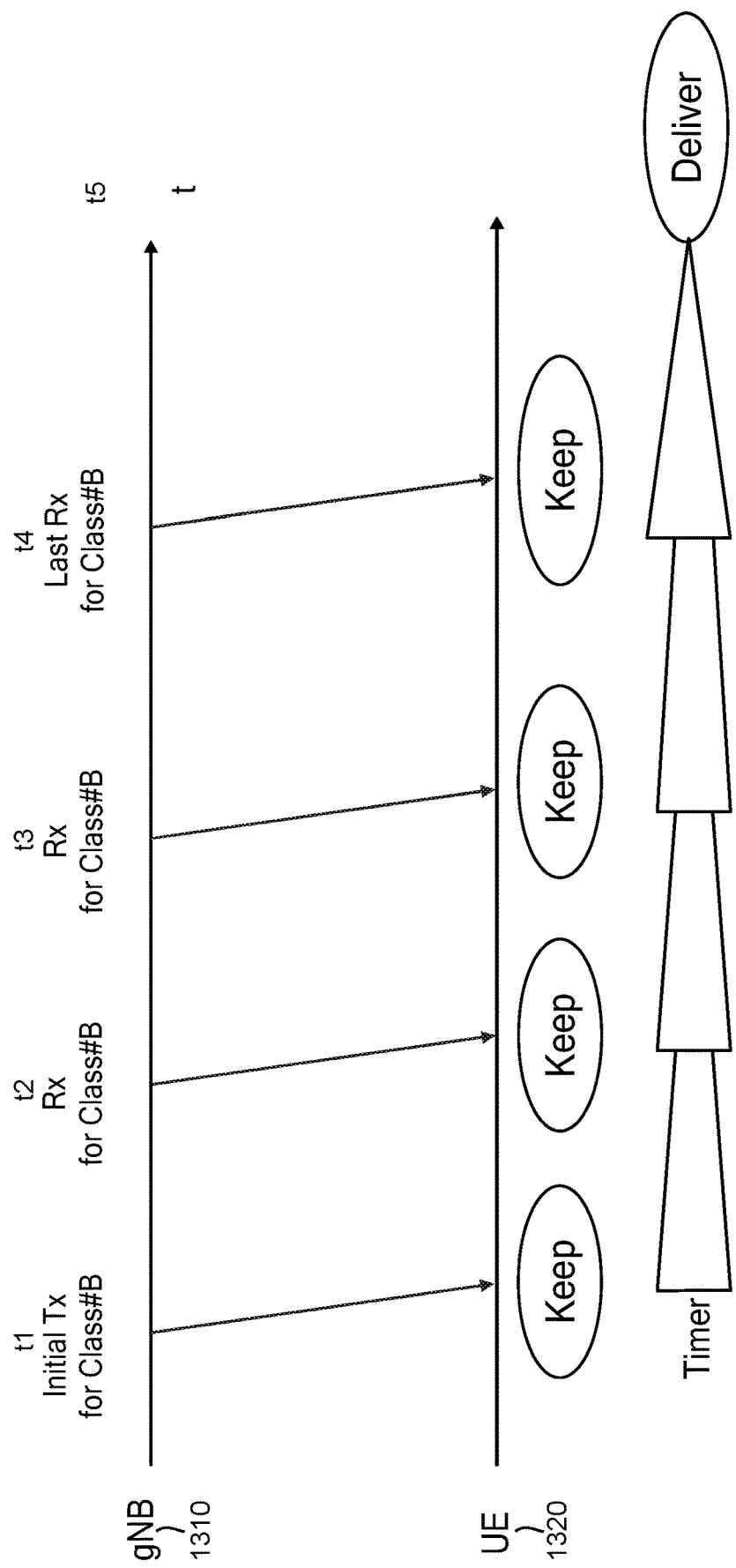
FIG. 13 is a timing diagram illustrating implicit indication for retransmission delivery, in accordance with aspects of the present disclosure.

FIG. 13 is a timing diagram illustrating implicit indication for retransmission delivery, in accordance with aspects of the present disclosure. In the example of FIG. 13 a base station (e.g., gNB) timeline 1310 and a UE timeline 1320 are shown. At time t1, the base station sends an initial transmission (Tx) for Class B data to the UE. Because the transmission is not successfully decoded, the UE keeps the information in its buffer at the physical layer and starts a timer. At time t2, the base station sends a first retransmission (Rx) for Class B data to the UE. Because the retransmission is not successfully decoded and the timer has not expired, the UE keeps the information in its buffer at the physical layer. At time t3, the base station sends a second retransmission for Class B data to the UE. Because the retransmission is still not successfully decoded and the timer has not expired, the UE keeps the information in its buffer at the physical layer. At time t4, the base station sends a final retransmission for Class B data to the UE. Because the retransmission is still not successfully decoded and the timer has not expired, the UE keeps the information in its buffer at the physical layer. At time t5, the timer expires. Thus, the UE delivers the information in its buffer at the physical layer to upper layers. The delivery occurs due to timer expiration, regardless of whether errors occur while decoding the retransmission.

Redundancy in a layer two (L2) header will now be described. As previously described, the physical layer may check for whether Class A data has errors. According to aspects of the present disclosure, the error check may also or independently occur at layer two (L2). For example, errors may be detected in an L2 level.

Figures 14, 15:
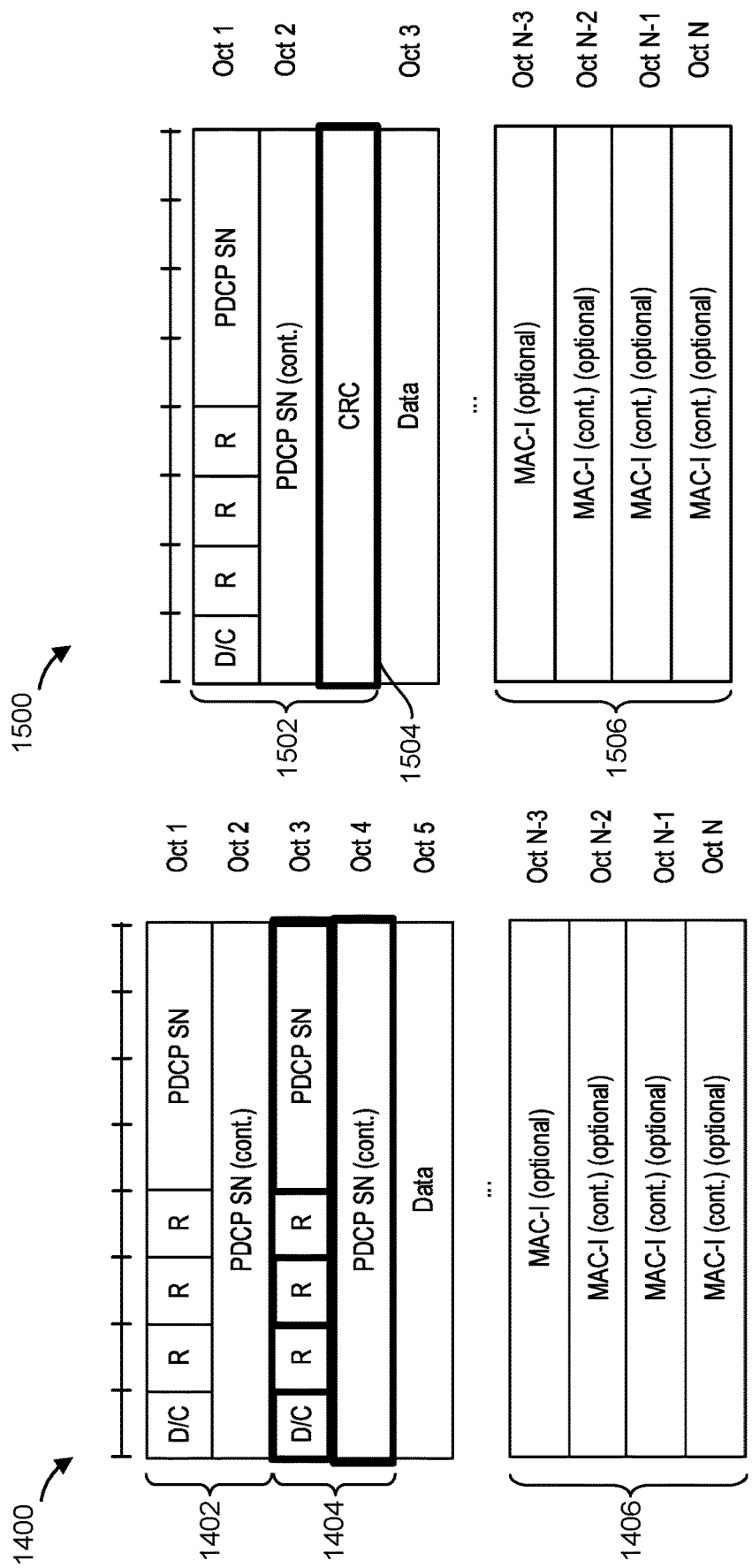
FIG. 14 is a block diagram illustrating repetition in a layer two (L2) header, according to aspects of the present disclosure.
FIG. 15 is a block diagram illustrating cyclic redundancy check (CRC) information in a layer two (L2) header, according to aspects of the present disclosure.

In these aspects, a PDCP header may be repeated in the PDCP PDU. Thus, the receiver processes the PDCP PDU only if the header part is confirmed by checking the consistency. FIG. 14 is a block diagram illustrating repetition in a layer two (L2) header, according to aspects of the present disclosure. In the example of FIG. 14, a PDCP PDU 1400 includes a PDCP header 1402 and a payload 1406. A repetition 1404 of the first PDCP header 1402 is also included in the PDCP PDU 1400. Thus, the receiver processes the PDCP PDU only if the PDCP header 1402 matches the repetition 1404.

In other aspects, CRC is included in a PDCP header. The receiver processes the PDCP PDU only if the header part is confirmed with a CRC check. FIG. 15 is a block diagram illustrating cyclic redundancy check (CRC) information in a layer two (L2) header, according to aspects of the present disclosure. In the example of FIG. 15, a PDCP PDU 1500 includes a PDCP header 1502 and a payload 1506. The PDCP header 1502 also includes CRC information 1504. Thus, the receiver processes the PDCP PDU 1500 only if the header part is confirmed with a CRC check. Although a PDCP header has been described with reference to FIGS. 14 and 15, the disclosure is not so limited. These techniques also apply to other layer two entities, such as SDAP RLC, and MAC entities.

According to aspects of the present disclosure, control data (C) and user data (U) may be identified based on logical channels (LCHs). Previously, it was described that L1 determines classes of the bit sequence within the same MAC subPDU and across different MAC subPDUs. When looking across different MAC subPDUs, the MAC layer may also determine the data classes. These aspects may apply in addition to the L1 option described above.

Figure 16:
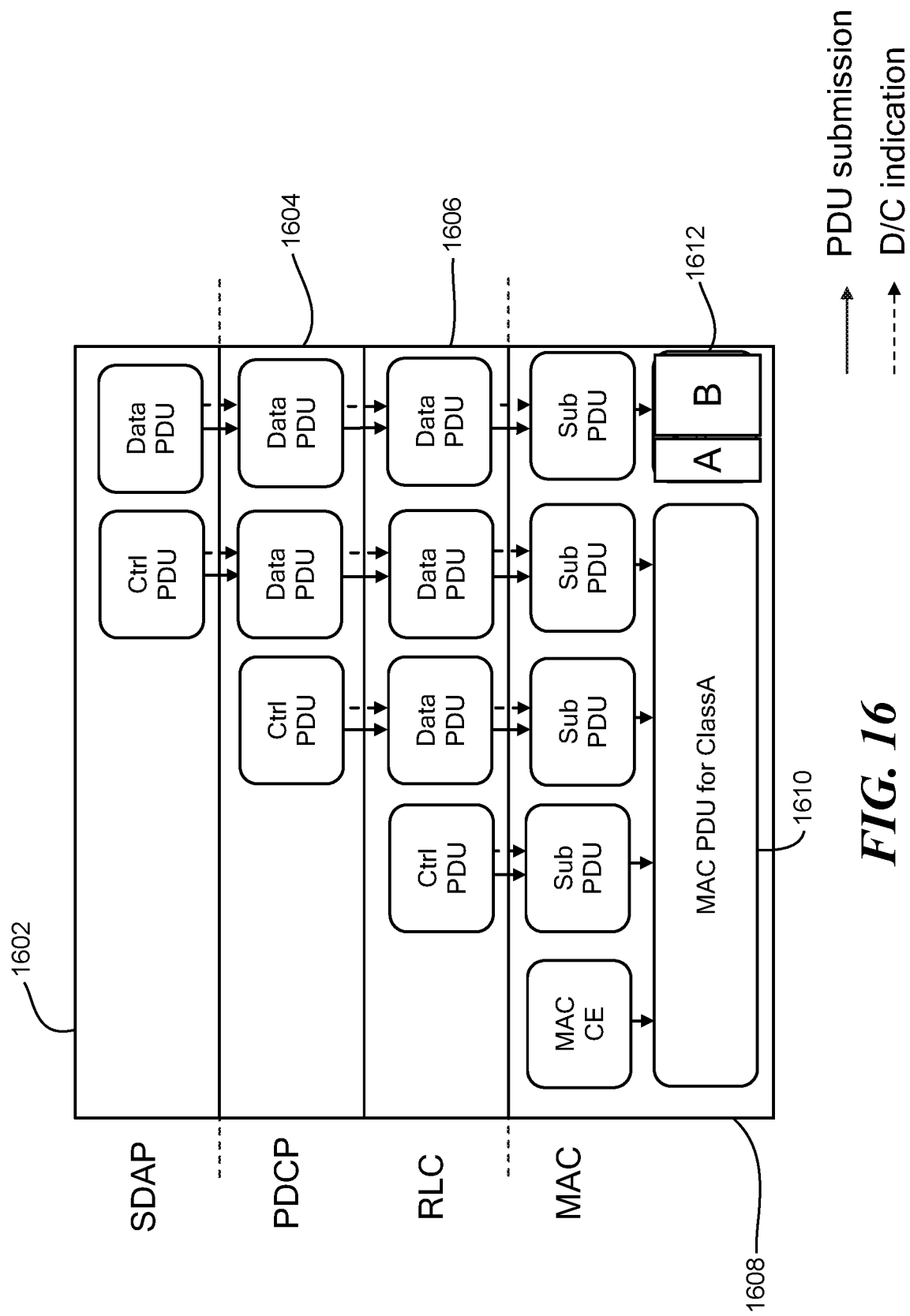
FIG. 16 is a block diagram illustrating medium access control (MAC) determining of data types, in accordance with aspects of the present disclosure.

FIG. 16 is a block diagram illustrating medium access control (MAC) determining of data types, in accordance with aspects of the present disclosure. In the example of FIG. 16, the upper layer is not shown for ease of explanation. An SDAP layer 1602 generates a control PDU and a data PDU. The SDAP layer 1602 indicates to a PDCP layer 1604 whether each PDU is control data or user data. The PDCP layer 1604 generates data PDUs based on the information received from the SDAP layer 1602. The PDCP layer 1604 also generates a header in a control PDU. The PDCP layer 1604 passes its control and data PDUs to an RLC layer 1606, which the RLC layer 1606 uses to generate data PDUs. The RLC layer 1606 also generates an RLC header in its control PDU. The RLC layer 1606 passes its data and control PDUs to a MAC layer 1608, along with information indicating whether each PDU is for data or control. The MAC layer 1608 uses this information to create a MAC PDU 1610 for Class A packets, and a MAC PDU 1612 including both Class A packets and Class B packets. The MAC layer classification may apply in addition to the L1 option previously described.

Currently, data mapping restrictions are implemented as logical channel priority (LCP) restrictions. According to aspects of the present disclosure, control/user (C/U) restrictions may be identified by LCP restrictions. In these aspects, control data and user data are mapped on separate logical channels, where control data is more important (e.g., Class A packets) and user data is less important (e.g., Class B packets). The control data and user data may be divided at the RLC layer because the same SDAP, PDCP, and RLC entities terminate data and control.

At the transmitter side, the RLC layer maps an RLC PDU to a corresponding logical channel based on the information. For example, the RLC entity in the UE may be configured with multiple logical channels and logical channel restrictions. The SDAP and PDCP layers submit packets to the RLC layer along with an indication of whether the packets are more important or less important. The RLC layer submits each PDU to the MAC layer in the corresponding logical channel. That is, more important PDUs (e.g., control data) are routed via a logical channel associated with more important packets, and less important PDUs (e.g., user data) are routed via a logical channel associated with less important packets.

The MAC layer performs data mapping based on logical channel priority restrictions, such that packets received via different logical channels are placed in different MAC PDUs to allow different treatment at the physical layer. The logical channel priority restrictions may be lifted by indication from the network via an RLC control PDU or a MAC CE. For downlink transmission, an F1 interface may be employed. The same principles may be applied for uplink communications, but the CU transfer data over the F1 interface with a new indication of whether or not the packets are important.

Figure 17:
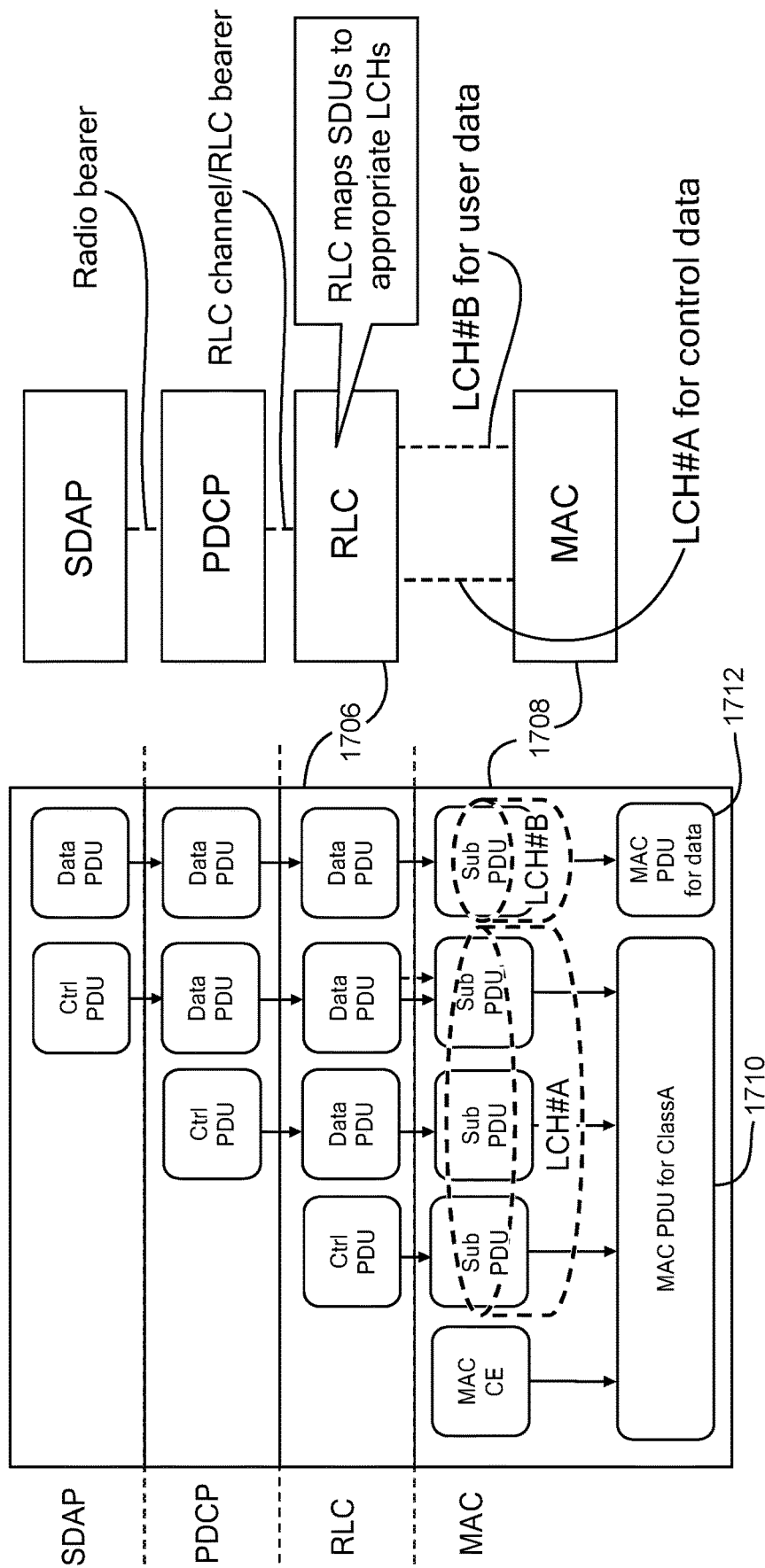
FIG. 17 is a block diagram illustrating logical channel restrictions corresponding to control and user data, in accordance with aspects of the present disclosure.

FIG. 17 is a block diagram illustrating logical channel restrictions corresponding to control and user data, in accordance with aspects of the present disclosure. In the example of FIG. 17, an RLC layer 1706 routes to a MAC layer 1708 Class A packets into sub-PDUs associated with a first logical channel (LCH A) and routes Class B packets into sub-PDUs associated with a separate logical channel (LCH B). Thus, the MAC layer 1708 may place the Class A packets (e.g., control data) in a first MAC PDU 1710 and the Class B packets (e.g., user data) in a second MAC PDU 1712 without understanding which packets are Class A data or Class B data. Rather, the MAC layer 1708 understands that packets routed via the first logical channel (LCH A) are more important than the packets routed via the second logical channel (LCH B).

As indicated above, FIGS. 4-17 are provided as examples. Other examples may differ from what is described with respect to FIGS. 4-17.

Figure 18:
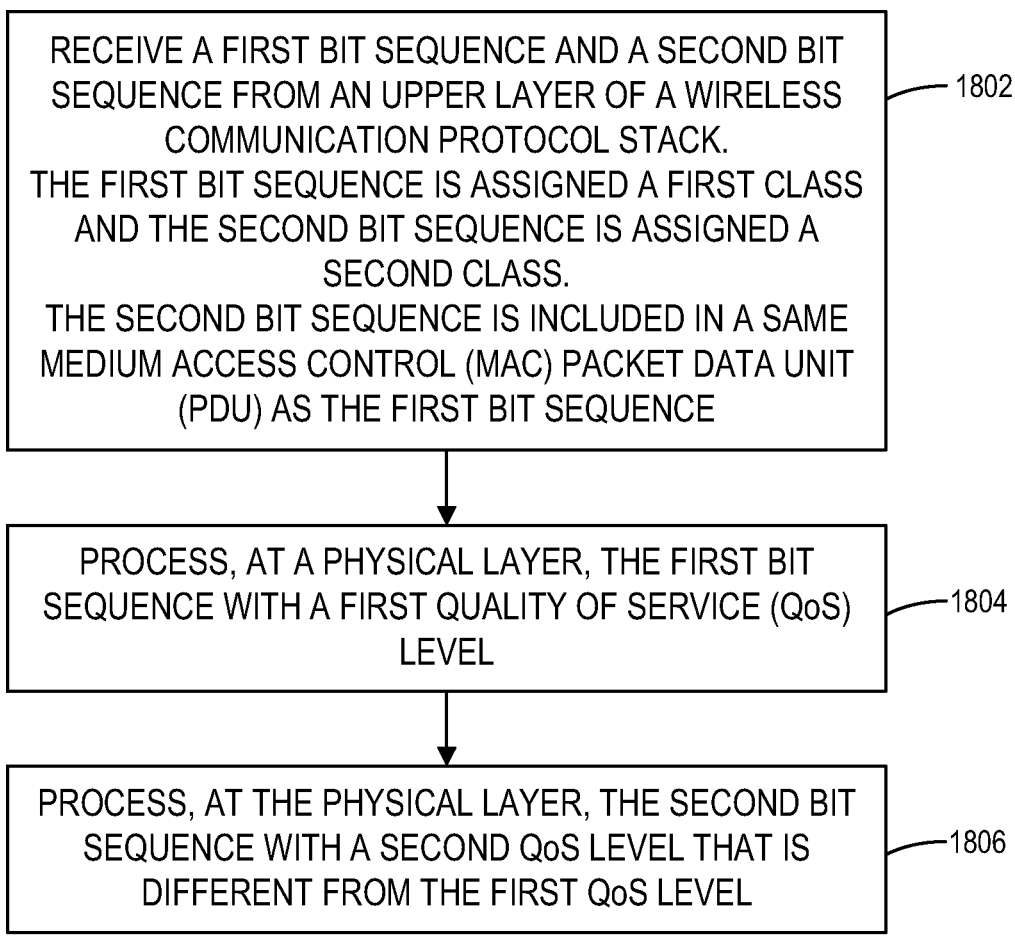
FIG. 18 is a flow diagram illustrating an example process performed, for example, by a wireless device, in accordance with various aspects of the present disclosure.

FIG. 18 is a flow diagram illustrating an example process 1800 performed, for example, by a wireless device, in accordance with various aspects of the present disclosure. The example process 1800 is an example of radio access network (RAN) enhancement for unequal error protection (UEP). The operations of the process 1800 may be implemented by a UE 120 or a network device 110.

At block 1802, the wireless device receives a first bit sequence and a second bit sequence from an upper layer of a wireless communication protocol stack. The first bit sequence is assigned a first class and the second bit sequence is assigned a second class. The second bit sequence is included in a same medium access control (MAC) packet data unit (PDU) as the first bit sequence. For example, the wireless device (e.g., using the antenna 234, 252, DEMOD/MOD 232, 254, MIMO detector 236, 256, receive processor 238, 258, controller/processor 240, 280 and memory 242, 282, and/or the like) may receive the sequences. In some aspects, the wireless device receives, from the upper layer, an indication of a classification of the first bit sequence. The indication may comprise length information associated with the first class.

At block 1804, the wireless device processes, at a physical layer, the first bit sequence with a first quality of service (QoS) level. For example, the wireless device (e.g., using the controller/processor 240, 280 and memory 242, 282, and/or the like) may process the first bit sequence. In some aspects, the wireless device detects errors in the first bit sequence at a MAC layer. In other aspects, the wireless device determines, at a MAC layer, a classification of the first bit sequence. In still further aspects, the wireless device transmits an indication of a decoding result of the first bit sequence to the upper layer.

At block 1806, the wireless device processes, at the physical layer, the second bit sequence with a second QoS level that is different from the first QoS level. For example, the UE (e.g., using the controller/processor 240, 280 and memory 242, 282, and/or the like) may process the second bit sequence.

EXAMPLE ASPECTS

Aspect 1: A method of wireless communication by a wireless device, comprising: receiving a first bit sequence and a second bit sequence from an upper layer of a wireless communication protocol stack, the first bit sequence assigned a first class and the second bit sequence assigned a second class and included in a same medium access control (MAC) packet data unit (PDU) as the first bit sequence; processing, at a physical layer, the first bit sequence with a first quality of service (QoS) level; and processing, at the physical layer, the second bit sequence with a second QoS level that is different from the first QoS level.

Aspect 2: The method of Aspect 1, further comprising receiving, from the upper layer, an indication of a classification of the first bit sequence.

Aspect 3: The method of Aspect 2 or 2, in which the indication comprises length information associated with the first class.

Aspect 4: The method of any of the preceding Aspects, further comprising transmitting an indication of length information for at least one of the first bit sequence or the second bit sequence.

Aspect 5: The method of any of the preceding Aspects, in which contents of the MAC PDU are pre-determined.

Aspect 6: The method of any of the preceding Aspects, further comprising receiving an indication for a HARQ process, the indication triggering delivery of an unsuccessfully decoded transport block containing the first bit sequence to the upper layer.

Aspect 7: The method of any of the preceding Aspects, further comprising transmitting an unsuccessfully decoded transport block containing the first bit sequence to the upper layer after a predetermined period of time elapses.

Aspect 8: The method of any of the preceding Aspects, further comprising detecting errors in the first bit sequence at a MAC layer.

Aspect 9: The method of any of the preceding Aspects, further comprising determining, at a MAC layer, a classification of the first bit sequence.

Aspect 10: The method of any of the preceding Aspects, further comprising transmitting an indication of a decoding result of the first bit sequence to the upper layer.

Aspect 11: An apparatus for wireless communication, comprising: a memory; and at least one processor coupled to the memory, the at least one processor configured: to receive a first bit sequence and a second bit sequence from an upper layer of a wireless communication protocol stack, the first bit sequence assigned a first class and the second bit sequence assigned a second class and included in a same medium access control (MAC) packet data unit (PDU) as the first bit sequence; to process, at a physical layer, the first bit sequence with a first quality of service (QoS) level; and to process, at the physical layer, the second bit sequence with a second QoS level that is different from the first QoS level.

Aspect 12: The apparatus of Aspect 11, in which the at least one processor is further configured to receive, from the upper layer, an indication of a classification of the first bit sequence.

Aspect 13: The apparatus of Aspect 11 or 12, in which the indication comprises length information associated with the first class.

Aspect 14: The apparatus of any of the Aspects 11-13, in which the at least one processor is further configured to transmit an indication of length information for at least one of the first bit sequence or the second bit sequence.

Aspect 15: The apparatus of any of the Aspects 11-14, in which contents of the MAC PDU are pre-determined.

Aspect 16: The apparatus of any of the Aspects 11-15, in which the at least one processor is further configured to receive an indication for a HARQ process, the indication triggering delivery of an unsuccessfully decoded transport block containing the first bit sequence to the upper layer.

Aspect 17: The apparatus of any of the Aspects 11-16, in which the at least one processor is further configured to transmit an unsuccessfully decoded transport block containing the first bit sequence to the upper layer after a predetermined period of time elapses.

Aspect 18: The apparatus of any of the Aspects 11-17, in which the at least one processor is further configured to detect errors in the first bit sequence at a MAC layer.

Aspect 19: The apparatus of any of the Aspects 11-18, in which the at least one processor is further configured to determine, at a MAC layer, a classification of the first bit sequence.

Aspect 20: The apparatus of any of the Aspects 11-19, in which the at least one processor is further configured to transmit an indication of a decoding result of the first bit sequence to the upper layer.

Aspect 21: An apparatus for wireless communication by a wireless device, comprising: means for receiving a first bit sequence and a second bit sequence from an upper layer of a wireless communication protocol stack, the first bit sequence assigned a first class and the second bit sequence assigned a second class and included in a same medium access control (MAC) packet data unit (PDU) as the first bit sequence; means for processing, at a physical layer, the first bit sequence with a first quality of service (QoS) level; and means for processing, at the physical layer, the second bit sequence with a second QoS level that is different from the first QoS level.

Aspect 22: The apparatus of Aspect 21, further comprising means for receiving, from the upper layer, an indication of a classification of the first bit sequence.

Aspect 23: The apparatus of Aspect 21 or 22, in which the indication comprises length information associated with the first class.

Aspect 24: The apparatus of any of the Aspects 21-23, further comprising means for transmitting an indication of length information for at least one of the first bit sequence or the second bit sequence.

Aspect 25: The apparatus of any of the Aspects 21-24, in which contents of the MAC PDU are pre-determined.

Aspect 26: The apparatus of any of the Aspects 21-25, further comprising means for receiving an indication for a HARQ process, the indication triggering delivery of an unsuccessfully decoded transport block containing the first bit sequence to the upper layer.

Aspect 27: The apparatus of any of the Aspects 21-26, further comprising means for transmitting an unsuccessfully decoded transport block containing the first bit sequence to the upper layer after a predetermined period of time elapses.

Aspect 28: The apparatus of any of the Aspects 21-27, further comprising means for detecting errors in the first bit sequence at a MAC layer.

Aspect 29: The apparatus of any of the Aspects 21-28, further comprising means for determining, at a MAC layer, a classification of the first bit sequence.

Aspect 30: The apparatus of any of the Aspects 21-29, further comprising means for transmitting an indication of a decoding result of the first bit sequence to the upper layer.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a wireless device, comprising:
   receiving a first bit sequence and a second bit sequence from an upper layer of a wireless communication protocol stack, the first bit sequence assigned a first class and the second bit sequence assigned a second class and included in a same medium access control (MAC) packet data unit (PDU) as the first bit sequence;
   processing, at a physical layer, the first bit sequence with a first quality of service (QOS) level associated with a first level of error protection; and
   processing, at the physical layer, the second bit sequence with a second QoS level that is different from the first QoS level, the second bit sequence associated with a second level of error protection that is different from the first level of error protection, the physical layer receiving first length information for the second bit sequence in a first MAC service data unit (SDU) and second length information for the second bit sequence in a second MAC SDU.

2. The method of claim 1, further comprising receiving, from the upper layer, an indication of a classification of the first bit sequence.

3. The method of claim 2, in which the indication comprises third length information associated with the first class.

4. The method of claim 1, in which contents of the MAC PDU are pre-determined.

5. The method of claim 1, further comprising receiving an indication for a HARQ process, the indication triggering delivery of an unsuccessfully decoded transport block containing the first bit sequence to the upper layer.

6. The method of claim 1, further comprising transmitting an unsuccessfully decoded transport block containing the first bit sequence to the upper layer after a predetermined period of time elapses.

7. The method of claim 1, further comprising detecting errors in the first bit sequence at a MAC layer.

8. The method of claim 1, further comprising determining, at a MAC layer, a classification of the first bit sequence.

9. The method of claim 1, further comprising transmitting an indication of a decoding result of the first bit sequence to the upper layer.

10. An apparatus for wireless communication, comprising:
    a memory; and
    at least one processor coupled to the memory, the at least one processor configured:

to receive a first bit sequence and a second bit sequence from an upper layer of a wireless communication protocol stack, the first bit sequence assigned a first class and the second bit sequence assigned a second class and included in a same medium access control (MAC) packet data unit (PDU) as the first bit sequence;

to process, at a physical layer, the first bit sequence with a first quality of service (QOS) level associated with a first level of error protection; and to process, at the physical layer, the second bit sequence with a second QoS level that is different from the first QoS level, the second bit sequence associated with a second level of error protection that is different from the first level of error protection, the physical layer receiving first length information for the second bit sequence in a first MAC service data unit (SDU) and second length information for the second bit sequence in a second MAC SDU.

11. The apparatus of claim 10, in which the at least one processor is further configured to receive, from the upper layer, an indication of a classification of the first bit sequence.

12. The apparatus of claim 11, in which the indication comprises third length information associated with the first class.

13. The apparatus of claim 10, in which contents of the MAC PDU are pre-determined.

14. The apparatus of claim 10, in which the at least one processor is further configured to receive an indication for a HARQ process, the indication triggering delivery of an unsuccessfully decoded transport block containing the first bit sequence to the upper layer.

15. The apparatus of claim 10, in which the at least one processor is further configured to transmit an unsuccessfully decoded transport block containing the first bit sequence to the upper layer after a predetermined period of time elapses.

16. The apparatus of claim 10, in which the at least one processor is further configured to detect errors in the first bit sequence at a MAC layer.

17. The apparatus of claim 10, in which the at least one processor is further configured to determine, at a MAC layer, a classification of the first bit sequence.

18. The apparatus of claim 10, in which the at least one processor is further configured to transmit an indication of a decoding result of the first bit sequence to the upper layer.

19. An apparatus for wireless communication by a wireless device, comprising:

means for receiving a first bit sequence and a second bit sequence from an upper layer of a wireless communication protocol stack, the first bit sequence assigned a first class and the second bit sequence assigned a second class and included in a same medium access control (MAC) packet data unit (PDU) as the first bit sequence;

means for processing, at a physical layer, the first bit sequence with a first quality of service (QOS) level associated with a first level of error protection; and means for processing, at the physical layer, the second bit sequence with a second QoS level that is different from the first QoS level, the second bit sequence associated with a second level of error protection that is different from the first level of error protection, the physical layer receiving first length information for the second bit sequence in a first MAC service data unit (SDU) and second length information for the second bit sequence in a second MAC SDU.

20. The apparatus of claim 19, further comprising means for receiving, from the upper layer, an indication of a classification of the first bit sequence.

21. The apparatus of claim 20, in which the indication comprises third length information associated with the first class.

22. The apparatus of claim 19, in which contents of the MAC PDU are pre-determined.

23. The apparatus of claim 19, further comprising means for receiving an indication for a HARQ process, the indication triggering delivery of an unsuccessfully decoded transport block containing the first bit sequence to the upper layer.

24. The apparatus of claim 19, further comprising means for transmitting an unsuccessfully decoded transport block containing the first bit sequence to the upper layer after a predetermined period of time elapses.

25. The apparatus of claim 19, further comprising means for detecting errors in the first bit sequence at a MAC layer.

26. The apparatus of claim 19, further comprising means for determining, at a MAC layer, a classification of the first bit sequence.

27. The apparatus of claim 19, further comprising means for transmitting an indication of a decoding result of the first bit sequence to the upper layer.

* * * * *